C. A. WATERBURY.
Improvement in Photographic Cameras.

No. 128,832. Patented July 9, 1872.

Witnesses:
John Becker
N. A. Graham

Inventor:
C. A. Waterbury
Per ——— Attorneys.

128,832

UNITED STATES PATENT OFFICE.

CHARLES A. WATERBURY, OF NEW YORK, N. Y.

IMPROVEMENT IN PHOTOGRAPHIC CAMERAS.

Specification forming part of Letters Patent No. 128,832, dated July 9, 1872.

Specification describing a new and Improved Photographic Camera, invented by CHARLES A. WATERBURY, of New York city, in the county and State of New York.

Figure 1:
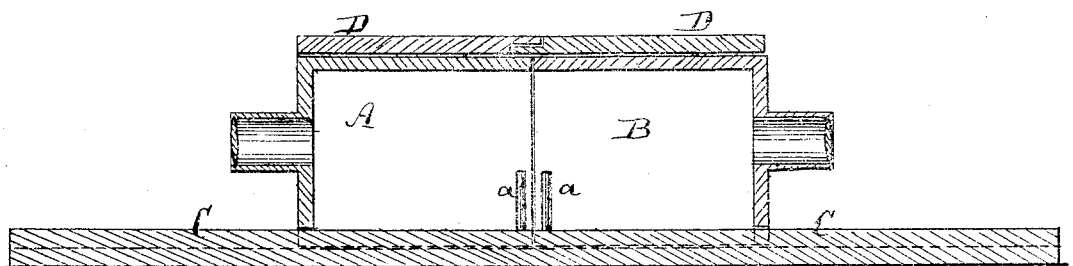
Figure 2:
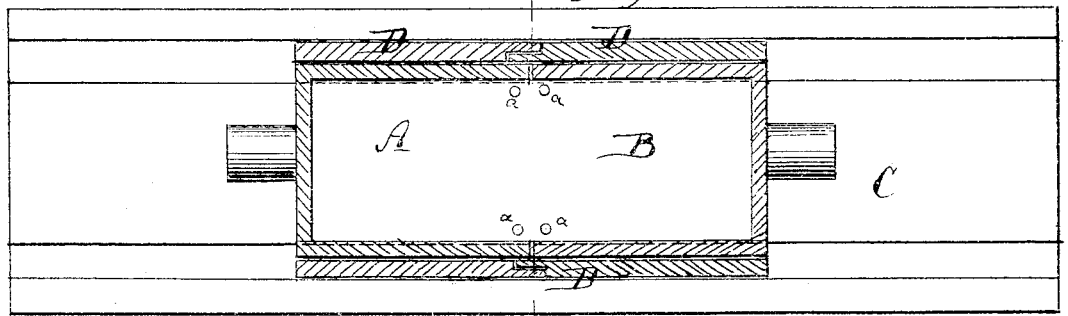
Figure 3:
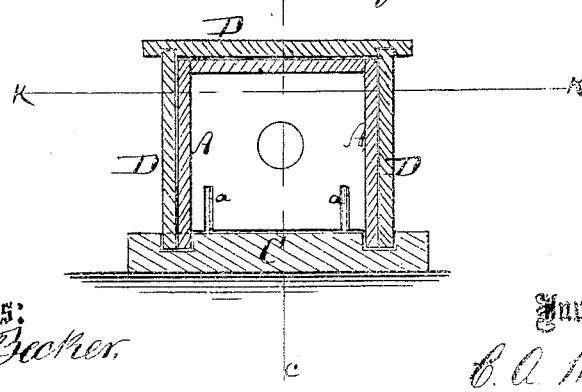

In the accompanying drawing, Figure 1 is a vertical longitudinal section of my improved double-headed photographic camera on the line $c c$, Fig. 3. Fig. 2 is a horizontal section of the same on the line $k k$, Fig. 3. Fig. 3 is a vertical transverse section of the same.

Similar letters of reference indicate corresponding parts.

This invention relates to a new photographic camera by means of which two pictures can be taken simultaneously, from opposite sides, on either side of a negative, or on two contiguous negatives. The invention consists in the arrangement of a double camera composed of two movable cases on a supporting-base, both in line with each other. The invention also consists in the use of a sliding mantle or side and top piece for closing the space between the two cameras when they are more or less drawn apart in use.

A B are the two cameras placed on a baseboard or support, C, and so held in grooves or on rails or other tracks of the latter that they can be moved apart or together, but will always retain the same position with regard to the axes of their lenses which are in line. The backs of the two cameras A B are or can be brought together, as shown in Figs. 1 and 2. At the place where they meet are, on the base C, projecting pins $a a$, or equivalent devices, for holding the negative or negatives. When the cameras are moved apart to admit the operator's head for adjusting the focus and obtaining the required distance from the object to be photographed it is necessary to subsequently close the space between the two cameras in order to prolong each toward and as far as the negative. This I do by means of side and top slides D D, which are drawn over the cameras and form one chamber between them. By means of these slides the space between the cameras is properly closed and the cameras can be drawn any suitable distance apart.

Having thus described my invention, I claim as new and desire to secure by Letters Patent—

1. The double-headed photographic camera herein described.

2. The supporting-base C, double camera A B, and mantle D, combined with each other, as specified.

3. The negative supports or holders $a a$ applied to the base C of the double-headed camera, as specified.

CHARLES A. WATERBURY.

Witnesses:
T. B. MOSHER,
W. A. GRAHAM.